United States Patent [19]

Stires, III

[11] 4,222,061

[45] Sep. 9, 1980

[54] TAMPER PROOF STRIP CHART RECORDER

[76] Inventor: John C. Stires, III, Box 988, Rambla de las Flores, Rancho Santa Fe, Calif. 92067

[21] Appl. No.: 946,794

[22] Filed: Sep. 28, 1978

[51] Int. Cl.² .......................................... G01D 15/00
[52] U.S. Cl. ................................. 346/145; 346/136; 346/19
[58] Field of Search .................. 346/145, 136, 33 TP, 346/19

[56] References Cited

U.S. PATENT DOCUMENTS

| | | | |
|---|---|---|---|
| 3,200,403 | 8/1965 | Bush | 346/19 |
| 3,787,885 | 1/1974 | Johnson | 346/145 |
| 4,074,275 | 2/1978 | Stires | 346/136 |
| 4,135,400 | 1/1979 | Maxwell et al. | 346/145 |

Primary Examiner—Monroe H. Hayes
Attorney, Agent, or Firm—Brown & Martin

[57] ABSTRACT

A portable strip chart recorder includes a generally box-like housing having a lid pivotally connected to one end thereof and a latch and locking mechanism at the other end thereof, the lid providing access to the interior thereof for mounting and removing a strip chart and a hatch opening and cover formed in the lid which provides access only to activating controls and a writing table over which the chart passes with the hatch cover having a non-externally accessible latch for preventing access to the interior of the housing once latched after the lid is closed and locked.

10 Claims, 7 Drawing Figures

U.S. Patent  Sep. 9, 1980  Sheet 2 of 2  4,222,061
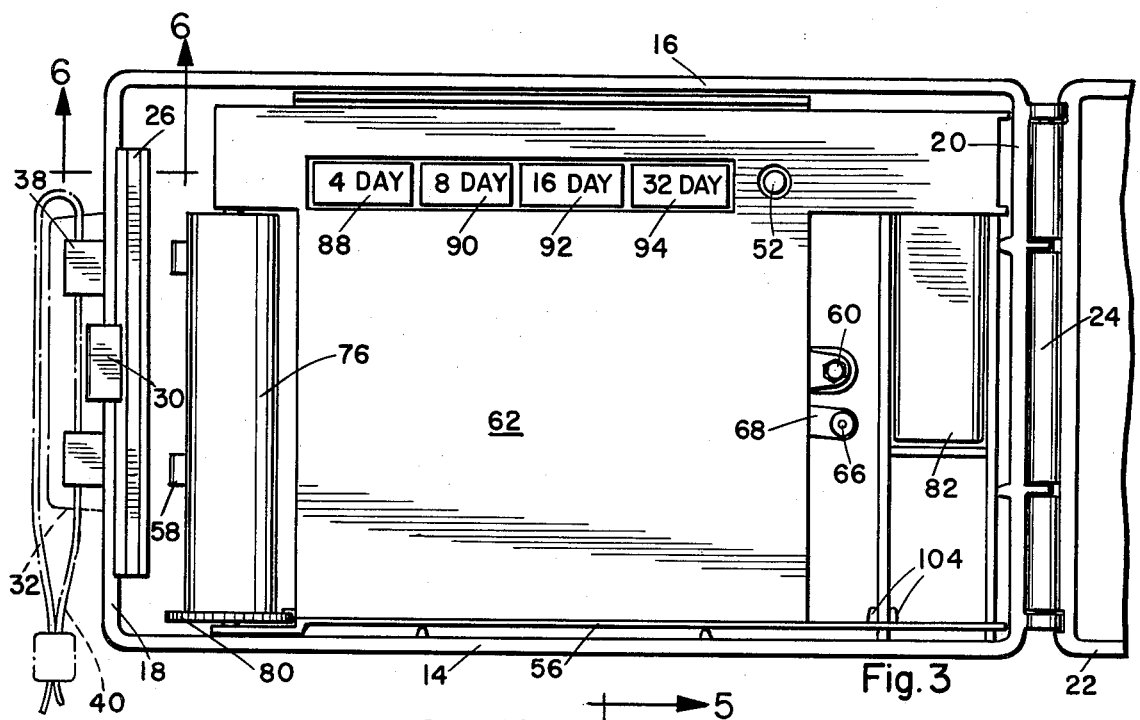
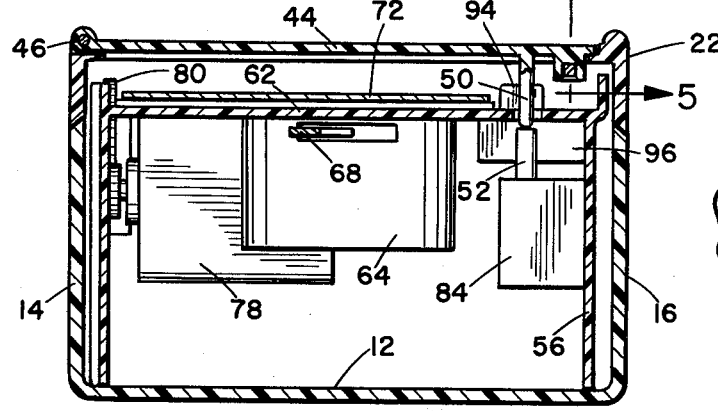
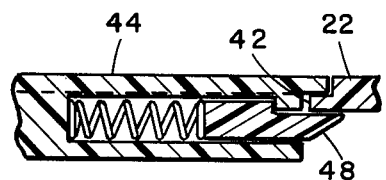
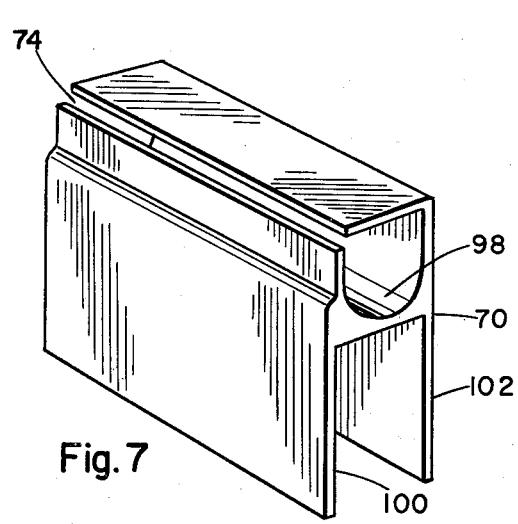
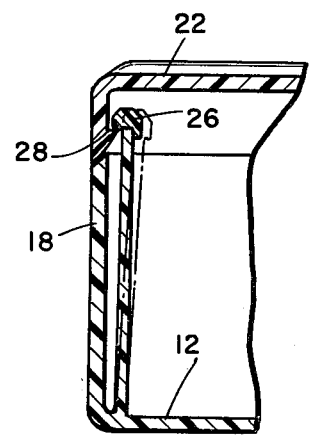

TAMPER PROOF STRIP CHART RECORDER

BACKGROUND OF THE INVENTION

The present invention relates to recording devices and pertains particularly to strip chart recorders. Condition recording devices for recording conditions in cargo containers and vehicles during shipment have been known and used for some time. Such recorders typically are arranged to record a condition versus time on a strip chart during storage or transit of cargo. This information is valuable in determining causes of damage and loss during storage or shipment.

These recorders have been devised for recording a number of different conditions, such as temperature, shock, vibrations, radiation flux density, and other conditions and factors which may affect the contents of a cargo space or container.

The reliability of the information recorded on a chart is a function of the reliability of the instrument as well as its ability to provide a tamper proof record. Many prior art recorders, while reliable in operation, fail to provide a secure chart which cannot be tampered with. As a result of this a record may be altered during or after shipment.

It is accordingly desirable that a strip chart recording instrument be available which provides security against alteration thereof, either during or after the recorded event.

It is also desirable that an instrument be available which is reliable and provides means for identification of the recorded events, time, etc.

SUMMARY AND OBJECTS OF THE INVENTION

It is accordingly the primary object of the present invention to overcome the above problems of the prior art.

Another object of the present invention is to provide a strip chart recorder which is substantially tamper proof.

Another object of the present invention is to provide a strip chart recorder which provides access to the chart for recording by writing or other means for identification of the recorded event.

A further object of the present invention is to provide a strip chart recorder which is secure against tampering, yet provides access for writing identification data on the chart and yet avoids interference with efficient functioning of the instrument.

In accordance with the primary aspect of the present invention, a strip chart recorder includes a generally box-like housing having a cover hinged thereto with a lockable latch at the other end for securing a strip chart in place and including a hatch opening and cover for providing access to time interval controls and a writing table over which the chart passes for recording identification data on the strip chart with a non-externally accessible latch on the hatch cover to prevent access to the chart once the instrument is locked and activated.

BRIEF DESCRIPTION OF THE DRAWINGS

The above and other objects and advantages of the present invention will become apparent from the following description when read in conjunction with the drawings, wherein:

FIG. 3 is a top plan view of the recorder with the cover open and the chart cassette removed.

FIG. 4 is a sectional view taken on line 4—4 of FIG. 2.

FIG. 5 is an enlarged sectional view taken on line 5—5 of FIG. 4.

FIG. 6 is a sectional view taken on line 6—6 of FIG. 3, and showing the cover latched.

FIG. 7 is a perspective view of the chart cassette.

DETAILED DESCRIPTION OF A PREFERRED EMBODIMENT

Figure 1:
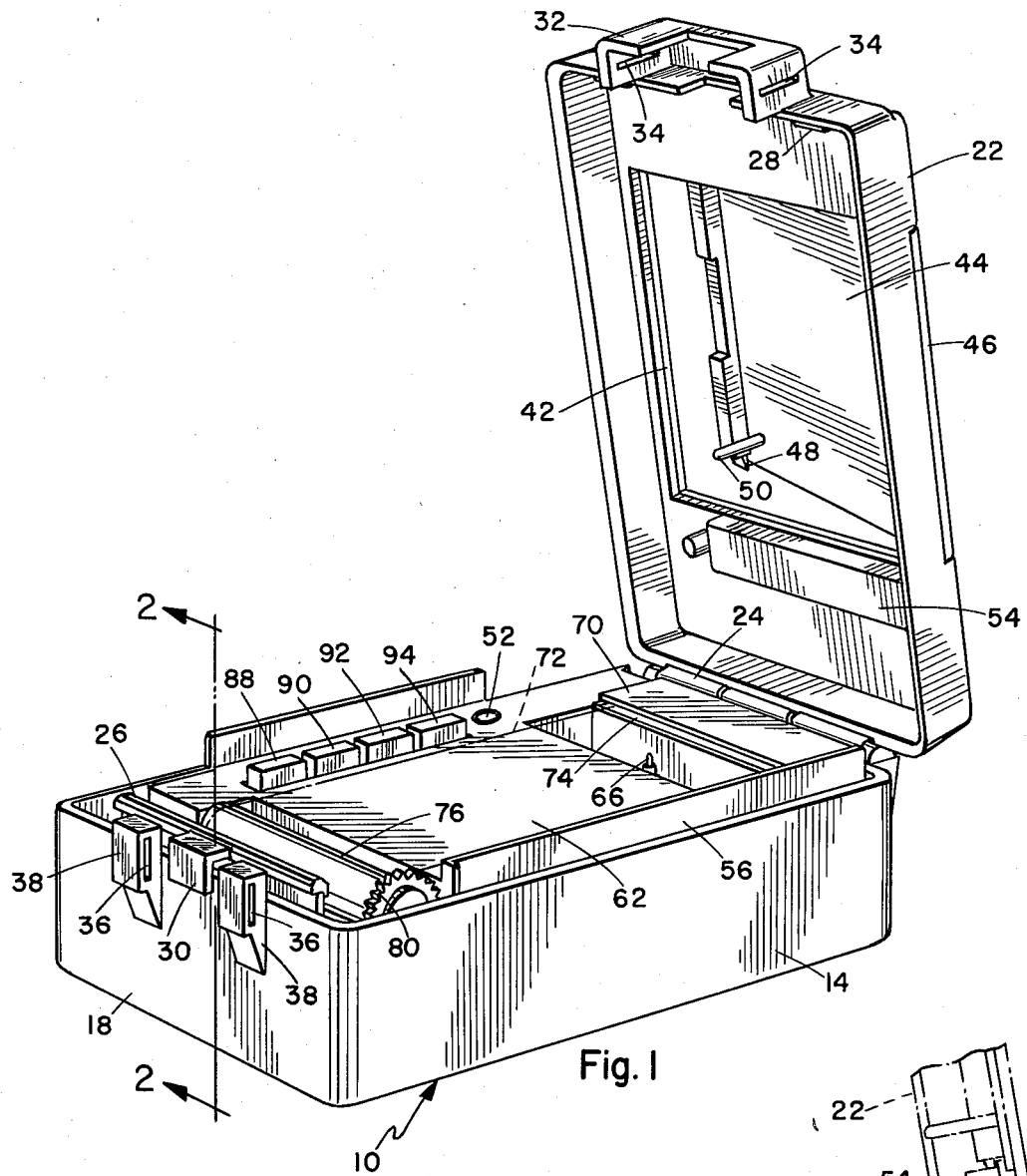
FIG. 1 is a perspective view of the recorder with the cover and hatch open.

Turning to FIG. 1 of the drawing, a strip chart recorder in accordance with the invention is designated generally by the numeral 10. The strip chart recorder includes a generally box-like housing comprising a bottom 12 with a pair of upwardly extending parallel side walls 14 and 16 and a pair of end walls 18 and 20 extending upward from the bottom. A cover 22 is hingedly connected to one end 20 by hinge means 24 and includes latch means at the other end, as best seen in FIG. 6, including a biased latch spring or member 26 in the housing for engaging a latch hook 28 on the cover. The latch spring or member 26 includes a releasing button 30 accessible from externally of the housing.

A locking bracket 32 on the housing includes slots 34, which align with slots 36 in a pair of bracket members 38 on the end 18 of the housing. These slots receive a locking or sealing element 40 of a known construction. This permits the housing to be closed, locked and sealed into position at the factory once the chart is loaded into the instrument.

The cover or lid 22 includes a hatch opening 42 of a generally square or rectangular configuration, as desired. This hatch opening is covered by means of a hatch member 44 which is pivotally connected or hinged at one side 46 to the lid 22. The hatch cover includes suitable non-externally accessible latch means in the form of a pair of spring biased pins 48, for example, which extend underneath the periphery of the hatch opening 42 engaging the undersurface of the top of the cover or lid 22, as in FIG. 5. The hatch member includes an activating pin 50 extending downward from the under surface thereof for engaging with a switch actuating button 52 within the main frame of the recording assembly. This hatch door and opening provides access to a table for writing on the chart and to selective controls within the instrument as will be explained. The door configuraton provides security to the chart such that the instrument may be loaded with a chart at the factory, for example, the lid locked in place with the hatch cover unlatched, and the instrument delivered to the customer. The customer then enters necessary information on the chart, selects a desirable time period, and thereafter closes the hatch to activate the instrument. A backup plate or surface 54 is mounted on the cover to back up the chart as will be explained for permitting a stylus or the like to engage and write or mark on the chart.

The instrument comprises generally a frame 56 which is mounted within the housing by means of brackets 58 and screw 60. The frame includes a planar surface 62 defining a writing table for supporting the strip chart only during writing on the chart, as will be explained.

The condition responsive means of the instrument, which in this instance is a temperature responsive device comprising a thermally responsive device or instrument 64 having a stylus 66 mounted on an arm 68 extending outward and engaging a chart passing between the stylus and backup plate 54. Other condition responsive devices may be utilized within the mechanism.

The chart transport assembly includes a chart cartridge 70 mounted within the housing and supplying a chart 72 from a rolled condition through a slot 74 past backup plate 54 across and spaced above the face 62 to take-up reel or spool 76 rotatably mounted on the frame 55. The take-up spool 76 is driven by an electric clock motor 78 as seen in FIG. 4 drivingly engaging gear means at 80 on the take-up spool or reel 76. A control circuit for driving the instrument is disclosed, for example, in my U.S. Pat. No. 4,074,275, issued Feb. 4, 1978. This patent and the disclosure thereof is fully incorporated herein by reference.

Figure 2:
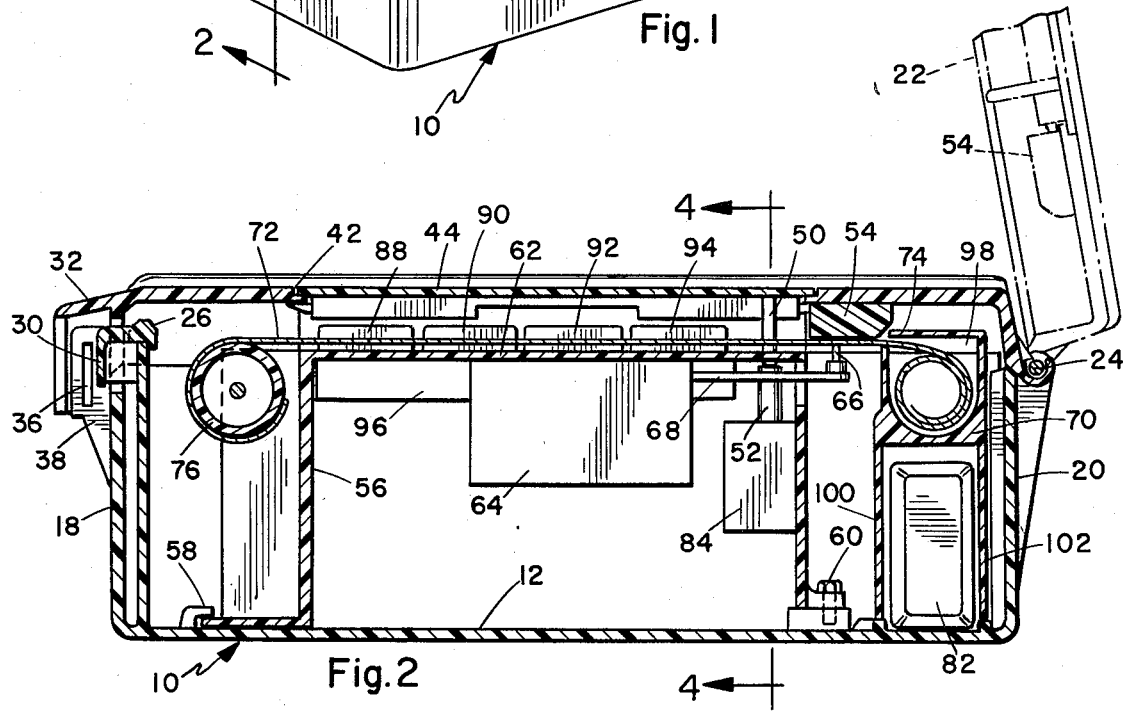
FIG. 2 is an enlarged sectional view taken on line 2—2 of FIG. 1, showing the closed and open positions of the cover.

Power for the instrument is supplied by means of a suitable battery, such as a 9 volt battery, 82 as shown in FIG. 2. This battery is connected into the circuit and the circuit is controlled by an on/off activating switch 84 which is activated by the hatch lid 44 and the pin 52 thereof.

The time selection sequence or time interval of the instrument is selected by means of push buttons 88, 90, 92 and 94 on switch assembly 96. These buttons and the table 62 are accessible through the hatch opening 42 when cover 44 is in the open position. As will be seen from FIG. 2, the table 62 is spaced from the cartridge 70 with access to the strip chart by means of the stylus 66 at a position between the end of the table and the cartridge 70. The back-up plate 54 is disposed to come into position between the end of the table and the cartridge above the stylus 66 to provide back up to insure proper engagement and marking on the chart as it passes therebetween. The mounting, supporting and transport of the chart is such that minimum friction is obtained therein. The low friction transport of the chart enhances the reliability of the instrument.

The supply cartridge is best illustrated in FIG. 7, for example, and as illustrated is constructed to provide a chart chamber 98 in which the rolled chart 72 is disposed and extending from slot 74 across and above table 62 to the take-up reel 76. The chart is simply rolled up without the use of a spindle or reel or the like and inserted into the chamber 90 with a portion thereof extending from slot 74. This provides a low friction construction which enhances the reliability of the instrument. The cartridge includes a pair of downwardly depending legs 100 and 102 which extend downward into the housing with leg 100 engaging a slot defined by a pair of strips or ridges 104 in the side wall 14 of the housing. Thus, the legs of the cartridge straddle and enclose the battery 82.

The housing and other structure of the invention is preferably constructed of a high impact resist durable plastic material. The instrument is of a portable type relatively small in size on the order, for example, of approximately 2×3×6 inches. The instrument may be placed in cargo containers or the cargo areas of transport vehicles such as trucks, trains, ships and the like. The duration of the storage or transport of the cargo is selected by pressing one of the buttons 88 through 94 as explained by prior application. The instrument is activated just prior to placement in the cargo space.

The above described instrument and construction thereof provides a relatively tamper proof construction and also provides access to the chart for recording information thereon. As will be seen, for example, from the drawings, the instrument is prepared for a trip by opening the instrument as shown in FIG. 1, including opening the hatch cover 44 by retracting the latch pins 48 from inside cover 22. A fresh chart is inserted in the cartridge or a fresh chart cartridge inserted in the instrument with the chart pulled across the table 62 and connected to take-up reel 76. The drive mechanism preferably includes a slip clutch, not shown, such that the reel may be driven forward a slight amount during the threading operation. Assuming the instrument has been previously tested before putting into operation, the lid or cover 22 is then closed with the hatch cover left open and a seal or lock 40 as shown in FIG. 4, put into position and sealed. The instrument is then ready to be placed within a cargo vessel or the like.

With the hatch cover open, the chart is accessible for writing on the portion thereof overlying the table 62 for entry of information regarding, for example, the cargo, the date, the shipper, the destination, origin, and the like. Additionally, the duration of the time interval selected for storage or transport may also be selected or entered on the chart. As soon as this is done, the duration is selected by pressing one of the time interval selection buttons and the hatch cover then pressed closed. The closing of the hatch cover engages the switch pin 52 by means of activating pin 50, thus activating the instrument drive circuit. This begins the driving or transporting of the chart from the cartridge 70 onto the take-up reel 76. The stylus 66 engages the chart and assumes a position in response to the temperature, for example, or other parameters to be measured within the cargo space. The stylus makes a mark upon the chart in response to this condition. The chart is driven at a rate which is representative of a time interval selected. Thus, during the interval selected, the condition to be measured is entered by stylus 66 upon the chart. After closing the hatch cover, access to the interior of the housing is gained only by breaking the seal 40, such as by cutting the straps or the like. Prior to closing the hatch cover, only the table or space of the chart above table 62 and the selection buttons for a time interval are accessible. Prior to this the cover 22 secures the cartridge 70 and the take-up reel 76 against any tampering.

While I have illustrated and described my invention by means of specific embodiments, it is to be understood that numerous changes and modifications may be made therein without departing from the spirit and scope of the invention as defined in the appended claims.

Having described my invention, I now claim:

1. A strip chart recording instrument, comprising:
   a housing;
   means for mounting a recording chart in said housing including a supply roll and a take-up roll with said chart extending across a space between said rolls;
   drive means having a predetermind drive time rate connected for driving said take-up roll;
   a writing support table extending between said rolls for supportint said chart for writing on one side of said chart;
   an opening between one end of said table and said supply roll;

a condition responsive device mounted in said housing for recording on the other side of said chart through said opening;

a cover for said housing having an open position for providing access to said supply roll and said take-up roll, and a closed position for securing said rolls from access; and a hatch in said cover, said hatch having an open position for providing access to the portion of said chart over said table for writing on said chart, said hatch having a non-externally accessible latch for latching said hatch in a closed position for preventing access to said chart through said hatch opening when said cover and said hatch is closed.

2. The strip chart recorder of claim 1, wherein:
said supply roll and said take-up roll are disposed to support said chart spaced above said table.

3. The instrument of claim 2, wherein said supply roll is spaced from one end of said table and the take-up roll is spaced from the other end of said table, and said cover when closed prevents access to said supply roll and said take-up roll while providing access to said writing table when said hatch cover is open.

4. The strip chart recorder of claim 3, including a backup plate supported on said cover and extending over a space between the end of the table and the supply reel for engagement by said condition responsive device.

5. The strip chart recorder of claim 4, wherein said condition responsive device is a thermally responsive element including a stylus for engaging said chart at said backup plate.

6. The recording instrument of claim 5, wherein said chart is a pressure sensitive chart.

7. The instrument of claim 4, wherein said supply roll is a cartridge detachably mounted in said housing and includes a roll of said recording chart disposed in a supply chamber.

8. The recording instrument of claim 7, wherein said recording chart extends from said chamber through a slot in said cartridge.

9. The recording instrument of claim 8, including a plurality of time interval selection buttons disposed adjacent one edge of said table;
said hatch opening providing access to said selection buttons when said hatch is in the open position.

10. The recording instrument of claim 9, including a control circuit having an activating/deactivating switch and said switch normally biased to a deactivating position, and
means on said hatch for biasiing said switch to an activating position.

* * * * *